(12) United States Patent
Biehl et al.

(10) Patent No.: US 11,013,666 B2
(45) Date of Patent: May 25, 2021

(54) SCALES AND INSTALLATION FOR PRODUCING A MEDICAL PREPARATION

(71) Applicant: FRESENIUS KABI DEUTSCHLAND GMBH, Bad Homburg (DE)

(72) Inventors: Martin Biehl, Wendel (DE); Michael Hock, Münzenberg (DE); Ulla Schöbel, Köthen (DE); Marcel Borgward, Neuenstadt/Stein am Kocher (DE); Holger Lenkeit, Dessau (DE); Dirk Lamprecht, Erlangen (DE); Sebastian Maier, Langenzenn (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 228 days.

(21) Appl. No.: 16/083,948

(22) PCT Filed: Mar. 15, 2017

(86) PCT No.: PCT/EP2017/056098
§ 371 (c)(1),
(2) Date: Sep. 11, 2018

(87) PCT Pub. No.: WO2017/158008
PCT Pub. Date: Sep. 21, 2017

(65) Prior Publication Data
US 2020/0289371 A1 Sep. 17, 2020

(30) Foreign Application Priority Data
Mar. 15, 2016 (EP) ..................................... 16160428

(51) Int. Cl.
*A61J 3/00* (2006.01)
*A61J 1/20* (2006.01)
*G01G 17/04* (2006.01)
*G01G 21/22* (2006.01)
*G01G 21/28* (2006.01)

(52) U.S. Cl.
CPC ............. *A61J 3/002* (2013.01); *A61J 1/2062* (2015.05); *G01G 17/04* (2013.01); *G01G 21/22* (2013.01); *G01G 21/28* (2013.01)

(58) Field of Classification Search
CPC ...... G01G 17/04; G01G 21/22; G01G 23/005; G01G 21/28; G01G 21/286; G01G 17/06; G01G 23/01; G01G 23/012; A61J 3/002; A61J 1/2062
See application file for complete search history.

(56) References Cited

U.S. PATENT DOCUMENTS

| | | | | |
|---|---|---|---|---|
| 3,811,523 A | * | 5/1974 | Artwick | G01G 19/46 177/180 |
| 4,155,412 A | * | 5/1979 | Luchinger | G01G 1/246 177/165 |
| 4,625,494 A | * | 12/1986 | Iwatschenko | A61M 39/281 53/432 |

(Continued)

FOREIGN PATENT DOCUMENTS

EP   1 779 830   5/2007

*Primary Examiner* — Randy W Gibson
(74) *Attorney, Agent, or Firm* — Occhiuti & Rohlicek LLP (57) ABSTRACT

The invention relates to a set of scales and to an installation for producing a medical composition using a set of scales. The set of scales comprise interchangeable securing means for a target container, the weight thereof being measured by the set of scales.

38 Claims, 10 Drawing Sheets

(56) References Cited

U.S. PATENT DOCUMENTS

| | | | | |
|---|---|---|---|---|
| 4,726,435 A * | 2/1988 | Kitagawa | G01G 7/02 | 177/212 |
| 4,878,552 A * | 11/1989 | Gebo | G01G 7/02 | 177/212 |
| 4,966,241 A * | 10/1990 | Luchinger | G01G 21/22 | 177/253 |
| 5,544,684 A * | 8/1996 | Robinette, III | G01G 17/06 | 141/100 |
| 5,721,398 A * | 2/1998 | Balsen | G01G 17/06 | 141/165 |
| 6,232,567 B1 * | 5/2001 | Bonino | G01G 17/06 | 141/165 |
| 6,354,159 B2 * | 3/2002 | Burkhard | G01G 21/22 | 73/1.01 |
| 6,539,334 B1 * | 3/2003 | Sawafta | G01G 17/06 | 141/165 |
| 6,603,081 B2 * | 8/2003 | Luchinger | G01G 21/28 | 177/126 |
| 6,781,068 B2 * | 8/2004 | Zahriya | G01G 7/06 | 177/127 |
| 6,898,549 B1 * | 5/2005 | Sawafta | G01G 17/06 | 141/165 |
| 6,958,453 B2 * | 10/2005 | Burkhard | G01G 23/005 | 177/184 |
| 7,227,088 B2 * | 6/2007 | Luechinger | G01G 21/286 | 177/180 |
| 7,550,683 B2 * | 6/2009 | Daughtry | G01G 19/4146 | 177/126 |
| 7,637,154 B1 * | 12/2009 | Robbins | G01F 19/00 | 220/530 |
| 7,651,664 B2 * | 1/2010 | Appoldt | G01G 23/3728 | 422/534 |
| 7,931,869 B2 * | 4/2011 | Gueller | G01N 35/10 | 422/509 |
| 8,178,779 B2 * | 5/2012 | He | H01L 51/0043 | 136/263 |
| 2003/0115929 A1 * | 6/2003 | Luchinger | G01G 21/22 | 73/1.01 |
| 2003/0188897 A1 * | 10/2003 | Ludi | G01G 7/06 | 177/127 |
| 2004/0035614 A1 * | 2/2004 | Zhang | G01G 7/06 | 177/127 |
| 2005/0045388 A1 * | 3/2005 | Burkhard | G01G 17/06 | 141/165 |
| 2006/0137915 A1 | 6/2006 | Luechinger | | |
| 2008/0230281 A1 | 9/2008 | Zeiss | | |
| 2010/0170723 A1 * | 7/2010 | Luchinger | G01G 21/22 | 177/145 |
| 2013/0019988 A1 * | 1/2013 | Jalenques | G01G 17/06 | 141/1 |
| 2014/0373975 A1 | 12/2014 | Koike | | |
| 2015/0232209 A1 * | 8/2015 | Jalenques | B65B 3/06 | 141/83 |
| 2018/0236154 A1 * | 8/2018 | Zeyher | A61M 1/1643 | |
| 2020/0179584 A1 * | 6/2020 | Wabel | A61M 1/287 | |

* cited by examiner

Detail A

SCALES AND INSTALLATION FOR PRODUCING A MEDICAL PREPARATION

CROSS REFERENCE TO RELATED APPLICATIONS

This application is the national phase under 35 USC 371 of international application no. PCT/EP2017/056098, filed Mar. 15, 2017, which claims the benefit of the priority dates of European Application No. 16160428.5 filed Mar. 15, 2016. The contents of the aforementioned applications are incorporated herein by reference in their entireties.

FIELD OF THE INVENTION

The invention relates to a scales (or balance) for weighing a target container. In particular, the invention relates to a scales (or balance), by means of which the target container of an installation for producing a medical preparation is weighed.

BACKGROUND OF THE INVENTION

Installations for producing a medical preparation are known, in particular installations for dosing a preparation composed of different ingredients for parenteral nutrition. These are also referred to as TPN compounders (TPN=Total Parenteral Nutrition). Known installations available on the market, such as the MultiComp® system from the company Fresenius, comprise a computer-controlled pump unit by means of which liquids are transferred from a plurality of source containers into a target container, so as to provide a medical preparation consisting of different components in the target container.

In installations of this type, it is known in practice to weigh the target container, which can be designed in particular as an infusion pouch, in order to monitor and/or control the quantities of the liquids dispensed.

In known installations available on the market, the attachment of this target container is often cumbersome. In particular, it is difficult to attach diverse types of target container, for example infusion pouches and/or syringes, to the scales. The target container can be weighed during, or at least at the end, of a dosing step. This can lead to the unwanted action of forces due to the tube with which the target container is filled, which may falsify the measurement result.

OBJECT OF THE INVENTION

In contrast, the object of the invention is to provide a balance which is designed in particular for use with a TPN compounder, and with which different types of target container, in particular infusion pouches and syringes, can be easily weighed.

SUMMARY OF THE INVENTION

The object of the invention is already achieved by a balance and by an installation for producing a medical preparation in accordance with one of the independent claims.

Preferred embodiments and extensions of the invention can be obtained from the subject matter of the dependent claims, the description and the drawings.

The invention relates to a balance for weighing a target container. In particular, the balance is designed for an installation for producing a medical preparation, in particular for a TPN compounder. For this purpose, the balance preferably comprises an interface, by means of which a control device of the installation for producing the medical preparation can collect the measurements from the scales.

The balance consists of a weighing dish for placing the target container into or onto. The weighing dish is designed in particular for depositing or the placement of infusion pouches and/or syringes.

In accordance with the invention, the weighing dish comprises a removable device which can be arranged in at least two or exactly two orientations on the weighing dish. This means that the device can be removed and rotated in such a way that what was previously the underside now faces upwards. Then the device can be placed back on the weighing dish. The device can therefore be arranged in two orientations in such a way that after a rotation, a previously downward facing side of the removable device faces upwards. The removable device is preferably designed as a plate.

The removable device, preferably the plate, has at least one mounting means for a target container at least on one side. The mounting means can also be abbreviated as a fastening. The removable device carries the at least one mounting means. It can therefore also be referred to as a carrier or carrier plate.

By simply removing the device, preferably the plate, and turning it over, the mounting means can be removed from the weighing dish and/or replaced by another mounting means which is located on the opposite side, for example of the plate.

It is provided in particular that the mounting means is provided in the form of a syringe holder. In one embodiment the syringe holder is designed as a preferably claw-like clamping element, in which in the case where a syringe is to be filled, the same can be clamped in place.

The syringe to be filled is thus positionally secured, which in particular reduces the risk of an accidental application of force during a weighing operation due to a connection tube.

In addition, as provided in one embodiment of the invention, the removable device can have another mounting means on the side on which the syringe holder is arranged. Preferably, the removable device has a first mounting means for a first infusion pouch. The first mounting means can also be abbreviated as a first fastening. In one embodiment the first mounting means is implemented as form-fitting elements, in particular as pins, onto which the first infusion pouch, which has two corresponding openings, in particular eyelets, is mounted.

In this embodiment of the invention it is provided that on one side of the device, preferably the plate, both a mounting means for a syringe and a mounting means for a first infusion pouch, as mentioned above, are present.

The securing element for the syringe is spaced apart from the first mounting means for the first infusion pouch, in particular from the form-fitting elements.

The first mounting means and/or the inserted first infusion pouch are designed in such a way that the latter does not rest on the syringe holder.

In one embodiment, in an area which is not covered by the device, preferably the plate, in the inserted condition the weighing dish has a second mounting means for a second infusion pouch. In one embodiment of the invention, form-fitting elements, in particular pins, are provided as the second mounting means. The second mounting means can also be abbreviated as a second fastening.

In particular, in this embodiment of the invention it is provided that both the weighing dish and the removable device each have mounting means, in particular form-fitting elements, for an infusion pouch.

The form-fitting elements arranged on the weighing dish are spaced further apart from one another than the form-fitting elements on the removable device, in particular on the plate.

This embodiment of the invention is used to provide a system in which infusion pouches in two different sizes and syringes can be placed for weighing in a simple manner.

If a larger infusion pouch is used, the side of a device designed as a plate on which the syringe holder is arranged is turned over in such a way that the syringe holder is at the bottom. In this state, the top of the plate is preferably flat.

The larger second infusion pouch can now be secured to, in particular hooked onto, the second mounting means of the weighing dish and rests neither on the form-fitting elements of the plate for the smaller infusion pouch nor on the syringe holder, since these elements are located on the underside.

If a smaller first infusion pouch is to be filled, the device preferably designed as a plate is turned over in such a way that the first mounting means, in particular the pins, is accessible in order to insert, in particular hook on, the smaller first infusion pouch. Due to the reduced dimensions of the smaller infusion pouch this is so small that it does not overlap with the syringe holder when placed in position.

It goes without saying that as an alternative to the smaller infusion pouch a syringe can also be inserted into the syringe holder and can thus be filled.

In the case of an extension of the invention, a receptacle for a calibration weight can be covered using the device preferably designed as a plate. The removable device in this design provides a cover.

This embodiment of the invention enables a compact design of a balance, in which the calibration weight can be inserted in a defined manner. It is provided in particular that the weighing dish or a holder for the weighing dish has a recess, in particular a cylindrical recess, into which the calibration weight can be placed or inserted to calibrate the scales.

In order to give the scales a compact design, the inserted calibration weight preferably protrudes out of the weighing dish. The calibration is carried out with the device or plate removed.

In the case of an extension of the invention the weighing dish is inclined with respect to a horizontal. In particular, the weighing dish is arranged at an angle between 5° and 40°, preferably between 10° and 20°, with respect to the horizontal. The weighing dish, or that part of the weighing dish, on which the target container is placed, is thus not horizontal when the weighing dish is in place. This allows a better accessibility, an improved flow performance into the pouch and furthermore improves the positioning in particular of an infusion pouch, which is e.g. pushed onto the form-fitting elements. Due to the force of gravity, this enables a more precise suspension of the infusion pouch on the form-fitting elements. Preferably, as previously shown, at least two spaced apart pins are used as form-fitting elements for the infusion pouch, so that the infusion pouch is fixed in both degrees of freedom with respect to the plane of the weighing dish.

In an extension of the invention the weighing dish comprises two angled side parts, preferably angled upwards.

In particular, the weighing dish is designed in the manner of a slide, in which the first mounting means, preferably the form-fitting elements, for a first infusion pouch are located in an upper region of the inclined slide-like arrangement.

Due to the angled side wings, which are preferably inclined at an angle between 20° and 40°, the positioning of an infusion pouch is likewise improved. At the same time, depositing of an infusion pouch is facilitated because as a result of the slide-like shape, the infusion pouch is centered during depositing.

In an extension of the invention, an overload protection is arranged between the weighing dish and a load cell.

A load cell with high accuracy, in particular a load cell having an accuracy of 0.1 g, preferably of 0.01 g, is preferably used as the load cell.

Such load cells are sensitive. To protect the load cell against damage in the case of an excessive load being applied, an overload protection is provided.

In a preferred embodiment of the invention, this is designed as a pre-tensioned spring which is arranged between a carrier for the weighing dish and the load cell.

The pre-tensioned spring, which is located in particular in a housing, transfers the force to the load cell up to a weight that is predetermined by the spring constant and pre-tensioning.

Outside of the intended measurement range, i.e. for loads that are too high, the spring compresses and a component connected to the spring goes solid, so that components connected to the load cell cannot be further compressed. The load cell therefore does not experience any greater force and is protected against damage.

The weighing dish is preferably removable from the load cell. If the user of the balance pulls on the weighing dish in an improper manner, then the latter is pulled out, which reduces the risk of damage to the load cell.

The user can thus also easily remove the weighing dish, for example for cleaning or disassembly.

The weighing dish and/or the removable device, which is provided in particular as a plate, are preferably made of a light material, such as aluminum or an aluminum alloy.

In order to ensure a high level of durability of the materials, the weighing dish and/or the removable device, provided in particular as a plate, are preferably coated, in particular with a nickel coating.

The invention also relates to an installation for producing a medical preparation, which comprises a plurality of source containers and a target container. The target container is arranged or can be positioned on a balance, in particular on a balance as described above.

Using the installation for manufacturing a medical preparation, the liquids described above are transferred from the source containers into the target container, in order to prepare an individual composition there. This process is usually computer-controlled.

In accordance with the invention the balance comprises a replaceable mounting means for the target container.

In particular, the scales can comprise a removable syringe holder. This may be, in particular, part of the previously described removable device, in particular the plate.

By using a removable syringe holder, both infusion pouches and syringes can easily be arranged at a defined position on the scales in order to fill the latter by means of the installation for producing a medical preparation.

For this purpose, the balance is preferably connected by means of an interface to an electronic control device for the installation, so that the amount of liquid transferred into the target container can be monitored by means of the scales.

The installation for producing the medical preparation together with the balance preferably has a modular structure, wherein the scales are designed as a separate, removable module.

An installation module can comprise, for example, the pump for transferring the fluids and valves, to control the withdrawal from the respective source containers.

In this way, a lightweight and compact system can be provided, in which in particular the individual modules can be carried by a single person. Preferably the balance comprises a tube holder, which is at approximately the same height as a tube holder of an adjacent installation module. Thus, the risk of the unwanted application of forces to the scales due to the connection tube of the target container is reduced.

BRIEF DESCRIPTION OF THE DRAWINGS

The subject matter of the invention will be described in the following, making reference to an exemplary embodiment and based on the drawings FIG. 1 to FIG. 11.

DETAILED DESCRIPTION OF THE DRAWINGS

Figure 1:
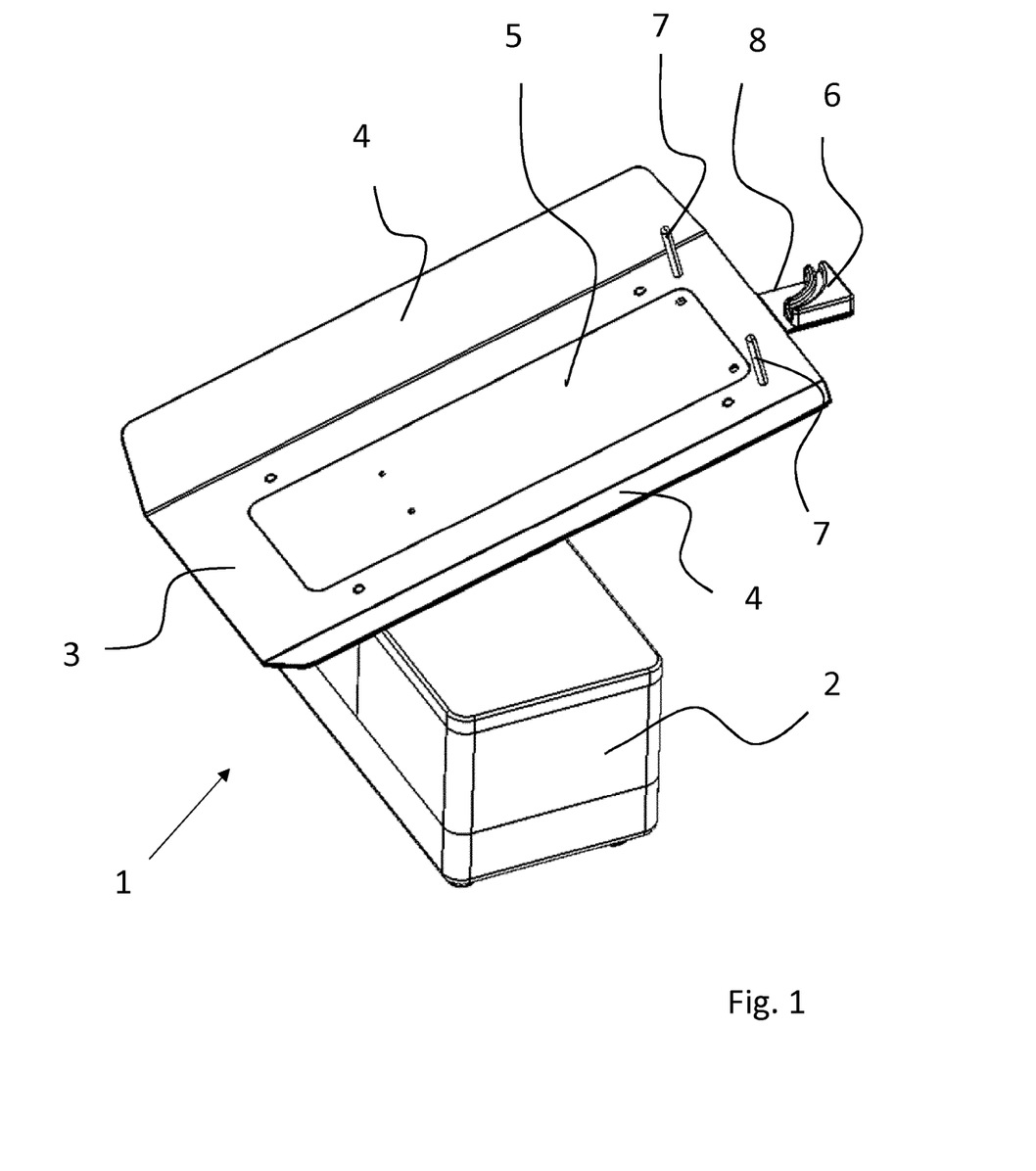
FIG. 1 is a perspective view of an exemplary embodiment of a balance according to the invention.

FIG. 1 shows an exemplary embodiment of a balance 1 according to the invention in a perspective view. The explanation of the scales 1 is based on an exemplary embodiment in which the removable device is designed as a plate 5.

The scales 1 comprise a housing 2, in which the load cell 20 and electronic control and regulation components (not shown) are arranged.

The housing 2 can be designed, as shown in this embodiment, substantially cuboid-shaped.

In this exemplary embodiment the main extension direction of the housing 2 in a plan view from above intersects the main extension direction of the weighing dish 3 at right angles. This ensures a better accessibility of the weighing dish 3 during depositing the target containers.

The weighing dish 3 is designed in the manner of, or shaped like, a slide and comprises side wings 4 angled upwards.

Also, the weighing dish 3 is tilted with respect to the horizontal, i.e. the weighing dish 3 is inclined upwards in the direction of the pins 7.

The pins 7 act as form-fitting elements for inserting an infusion pouch (not shown). The infusion pouch described here is designated in the general part of the description as the second infusion pouch.

The weighing dish 3 comprises a detachable plate 5, which in this exemplary embodiment is inserted in a recess 16 of the weighing dish 3.

The plate 5 in this illustration is designed flat.

An infusion pouch can be hooked onto the pins 7 spaced apart from the plate 5 and at least part of the pouch then rests on the plate 5.

At the upper end of the weighing dish 3, by means of a holder 8 a tube holder 6 is secured, through which the tube that is used to fill the infusion pouch (not shown) is passed. The holder 8 is inclined away from the weighing dish 3 and is approximately horizontal.

Figure 2:
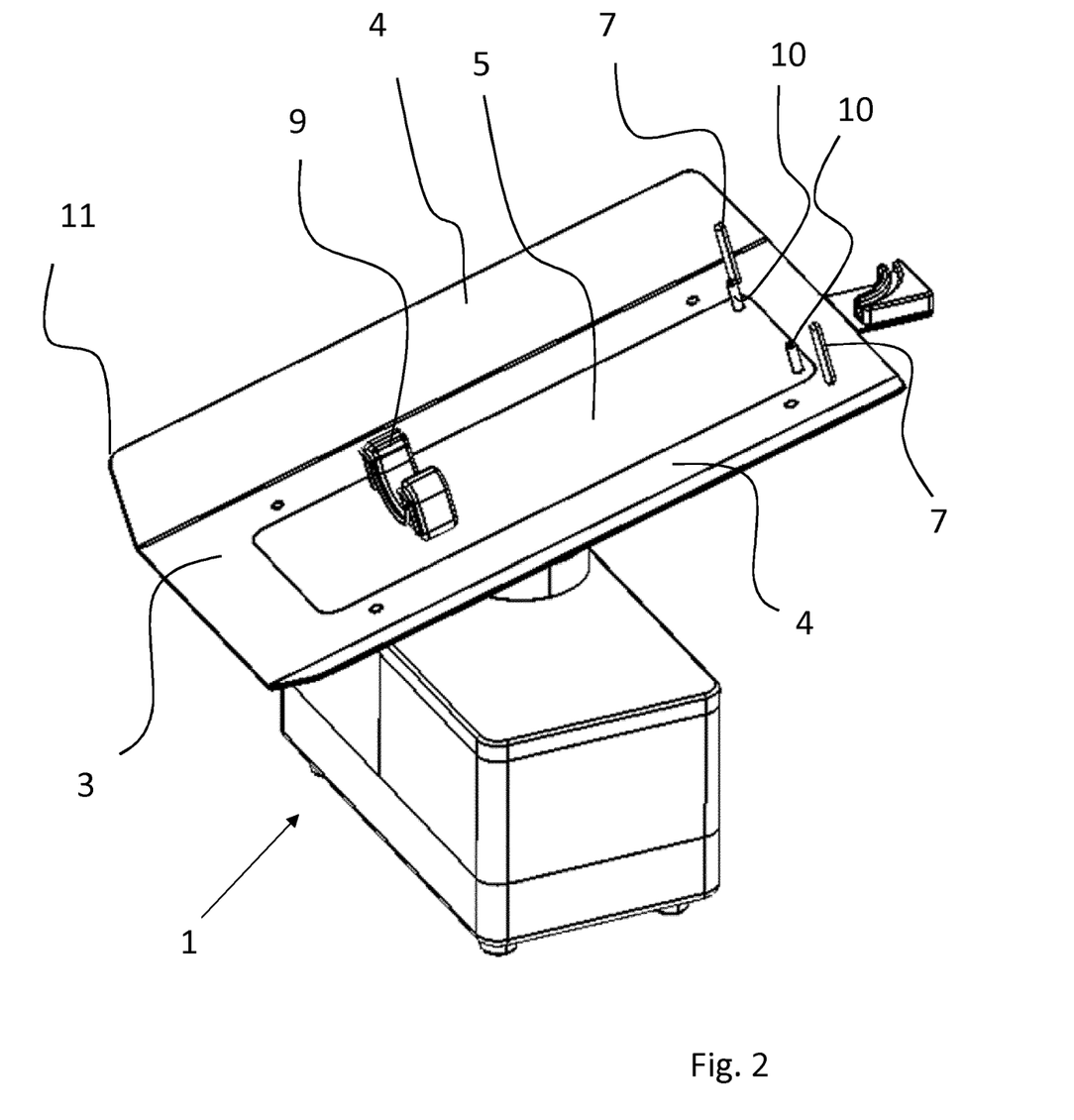
FIG. 2 is a further perspective view, in which in contrast to FIG. 1, a plate is rotated in such a way that a syringe holder is accessible.

FIG. 2 shows the balance 1 now in the state in which the plate 5 already shown in FIG. 1 has been removed and rotated by 180°. The previously downward facing side of the plate 5 is now pointing upwards.

It is now also evident that the plate 5 has been placed in the weighing dish 3 and that the plate 5 comprises a syringe holder 9. This is designed essentially U-shaped. The syringe holder 9 is located in a lower section of the plate 5 and is therefore spaced apart from the pins 7.

In addition to the syringe holder 9, the plate has two pins 10 in an upper section, which are used for hooking on an infusion pouch 13. The infusion pouch 13 has eyelets for this purpose. The infusion pouch described here is designated in the general part of the description as the first infusion pouch.

The side of the plate 5 facing upwards in this illustration therefore has both mounting means for a syringe, the syringe holder 9, and mounting means for an infusion pouch 13, the pins 10.

It is also evident that the edges 11 of the weighing dish 3 are rounded.

The weighing dish 3, including the side wings 4, preferably has a length of 300 to 500 mm and a width of 200 to 300 mm.

The plate 5 preferably has a length between 260 and 300 mm and a width between 70 and 120 mm.

Figure 3:
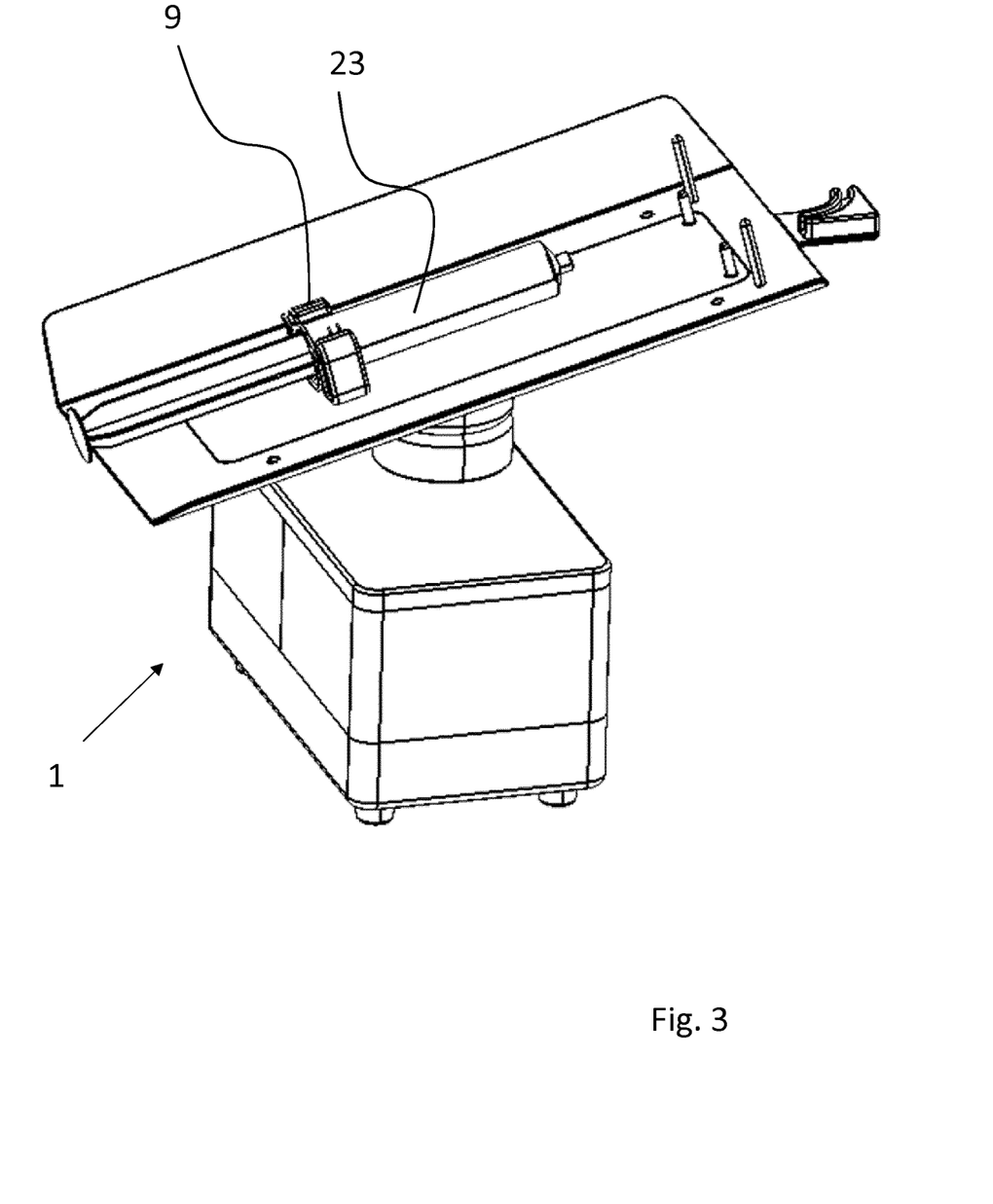
FIG. 3 shows the scales shown in FIG. 2 with a syringe inserted.

FIG. 3 shows how a syringe 23 is inserted into the scales 1.

The syringe 23 is clamped in the holder 9 and can thus be filled.

Figure 4:
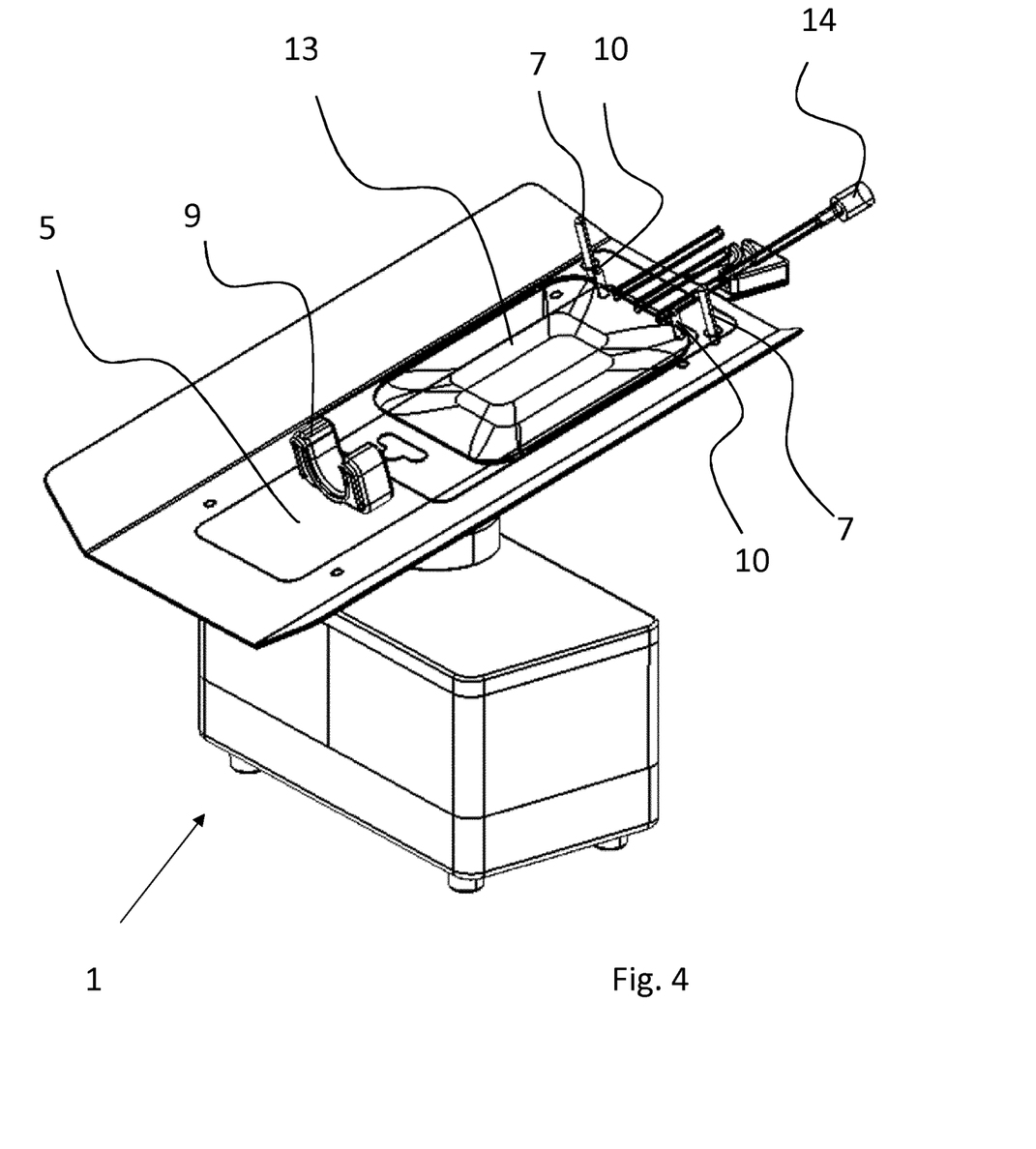
FIG. 4 shows the scales shown in FIG. 2 with infusion pouch inserted.

FIG. 4 shows the balance 1 in the state already shown in FIG. 2, i.e. in which the plate 5 is rotated so that the syringe holder 9 protrudes upwards.

Now, however, there is no syringe 23 inserted in the syringe holder 9, but an infusion pouch 13 is hooked onto the pins 10 above the syringe holder 9.

In this case the type of infusion pouch 13 is one that is small such that it does not rest on the syringe holder 9. The smaller infusion pouch 13 shown here can therefore be hooked onto the pins 10 attached to the plate 5.

In order to mount a larger infusion pouch (not shown), the scales are transferred into the state shown in FIG. 1, by the plate 5 being turned upside down so that it forms only a single level surface, and the larger infusion pouch can be hooked onto the pins 7.

Figure 5:
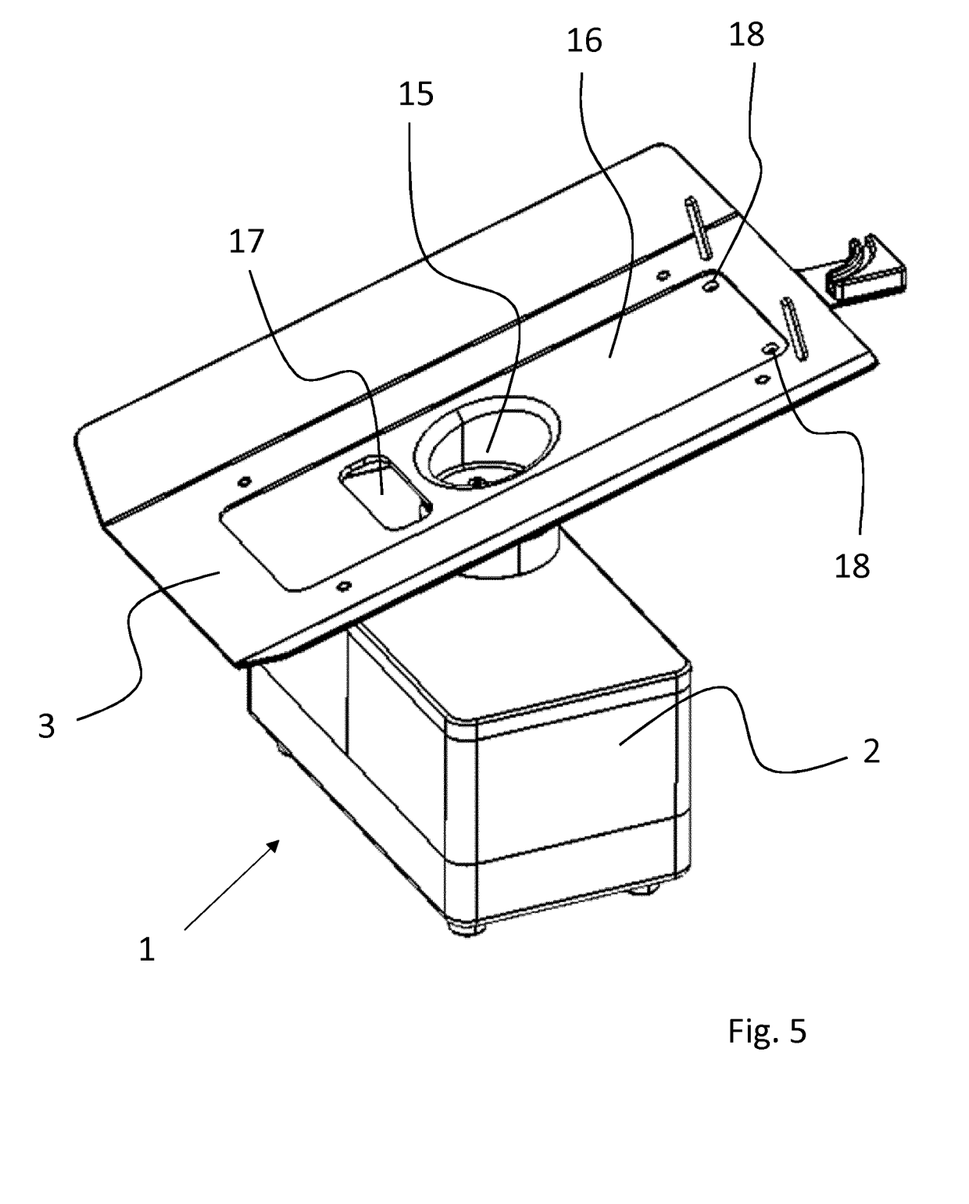
FIG. 5 shows the scales shown in FIG. 1 to FIG. 4 in a perspective view, wherein the plate has now been removed.

FIG. 5 shows the scales 1 shown in the preceding drawings, wherein the plate 5 has now been removed.

It is evident here that the weighing dish 3 has a recess 16. This is designed as a deepened section with respect to the adjacent weighing dish 3 and is used for inserting the plate 5.

The depth of the recess 16 is designed so that the top of the inserted plate 5 is flush with the adjacent weighing dish 3.

It can also be seen that in the area of the recess 16 the weighing dish 3 comprises an opening 17, through which the syringe holder 9 protrudes if the plate 5 is positioned with the flat side facing up.

The pins 10 present on the plate 5 to accommodate the smaller infusion pouch 13 then protrude through the holes 18, which are also made in the weighing dish 3 in the region of the recess 16.

Also evident is a receptacle 15, preferably cylindrical in design, which couples the weighing dish 3 and housing 2.

Figure 6:
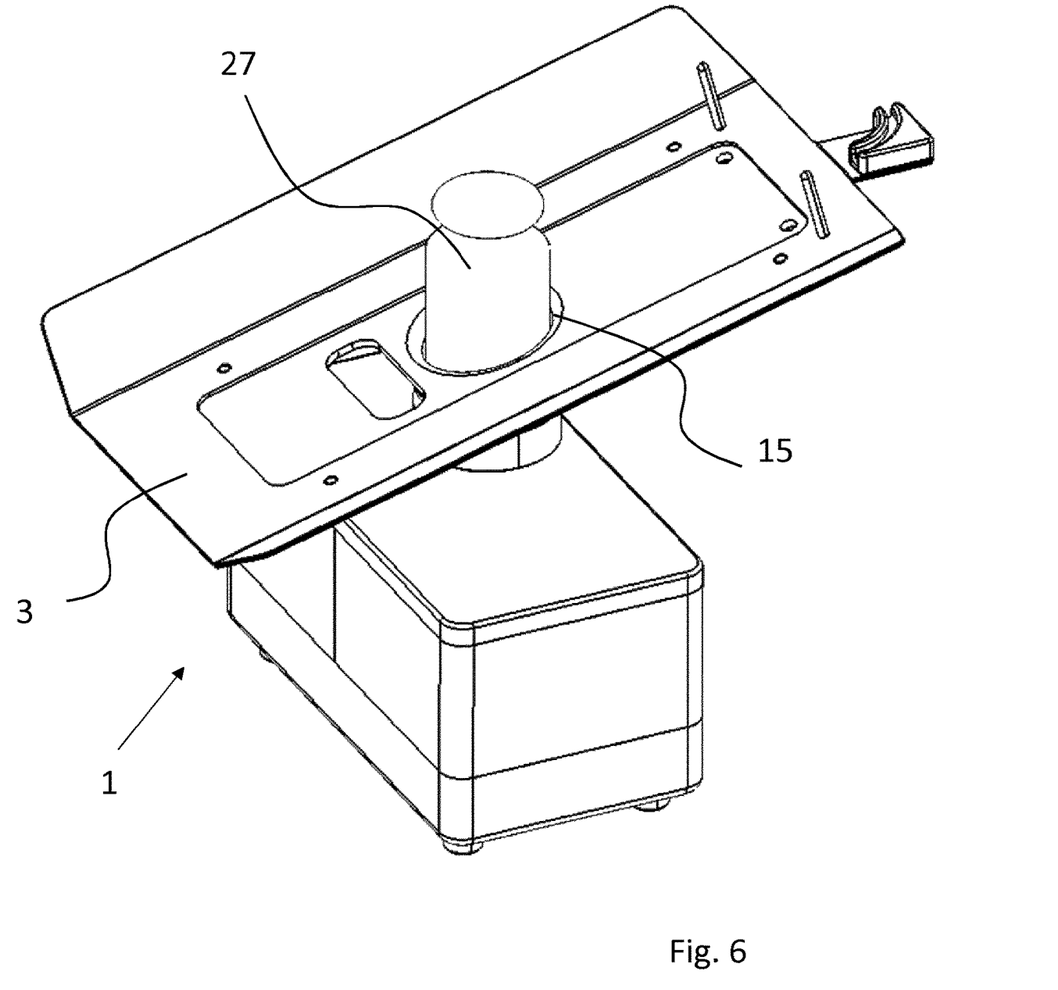
FIG. 6 shows the scales with a calibration weight inserted, in a perspective view.

As is clear in the perspective view in FIG. 6, a calibration weight 27 can be inserted into the receptacle 15. The calibration weight 27 in this case protrudes out of the weighing dish 3. This allows a particularly compact design while at the same time a well-defined positioning of the calibration weight 27.

Figure 7:
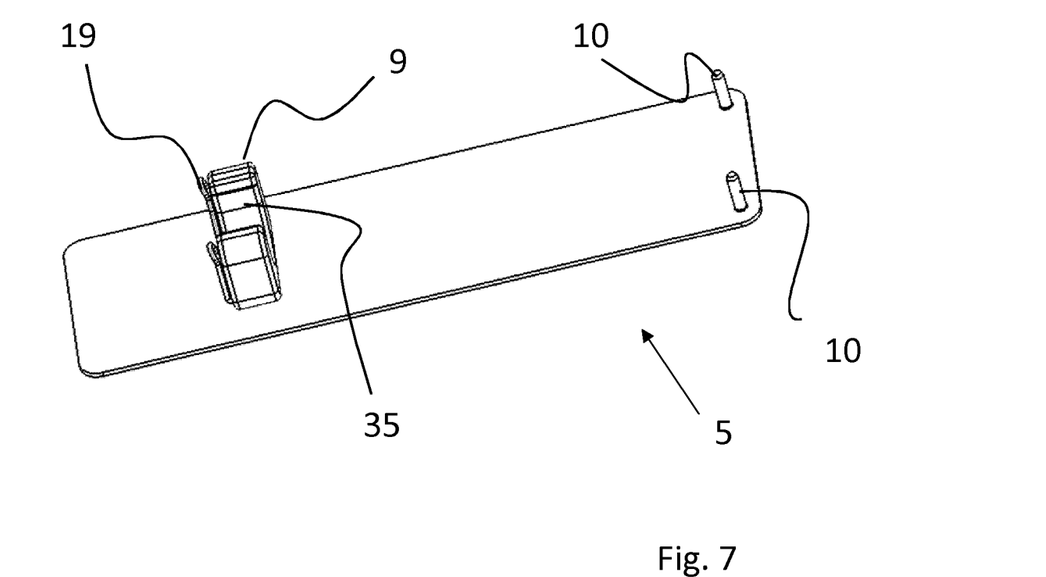
FIG. 7 and FIG. 8 are perspective views of the plate, which comprises the syringe holder.
Figure 8:
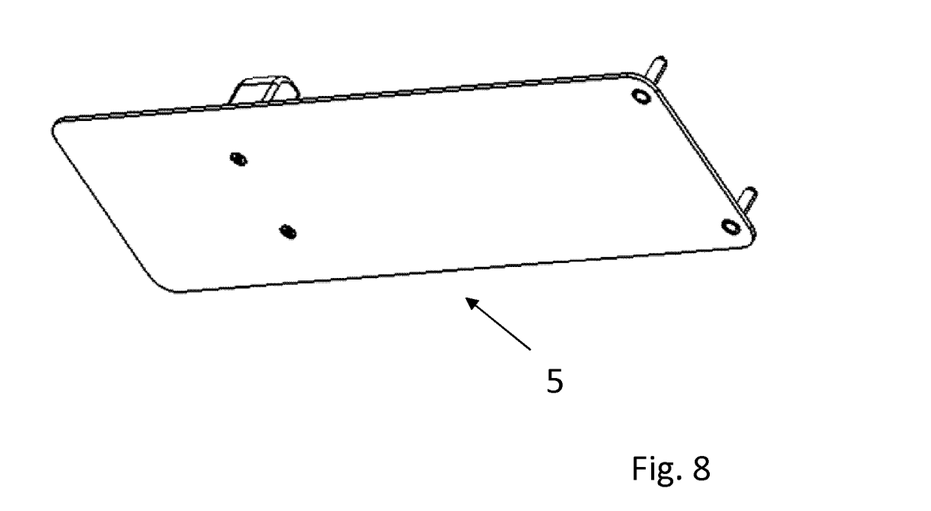

FIG. 7 and FIG. 8 show perspective views of the previously shown plate 5.

As is clearly shown in FIG. 7, in addition to the pins 10 the plate 5 comprises the syringe holder 9.

In this exemplary embodiment the syringe holder 9 consists of a U-shaped carrier 35. This is implemented, for example, as a plastic injection molded part.

The carrier 9 additionally comprises a U-shaped bracket 19, preferably made of metal, and which acts as an elastic force-fitting element for holding the syringe 23.

In an alternative design, however, it is also possible that the U-shaped carrier 35 performs a clamping action alone, i.e. without a separate bracket 19.

FIG. 8 shows the opposite side of the plate 5. It is evident that the plate 5 is designed flat on this side and has no protruding mounting means. The corners of the plate 5 are rounded.

Figure 9:
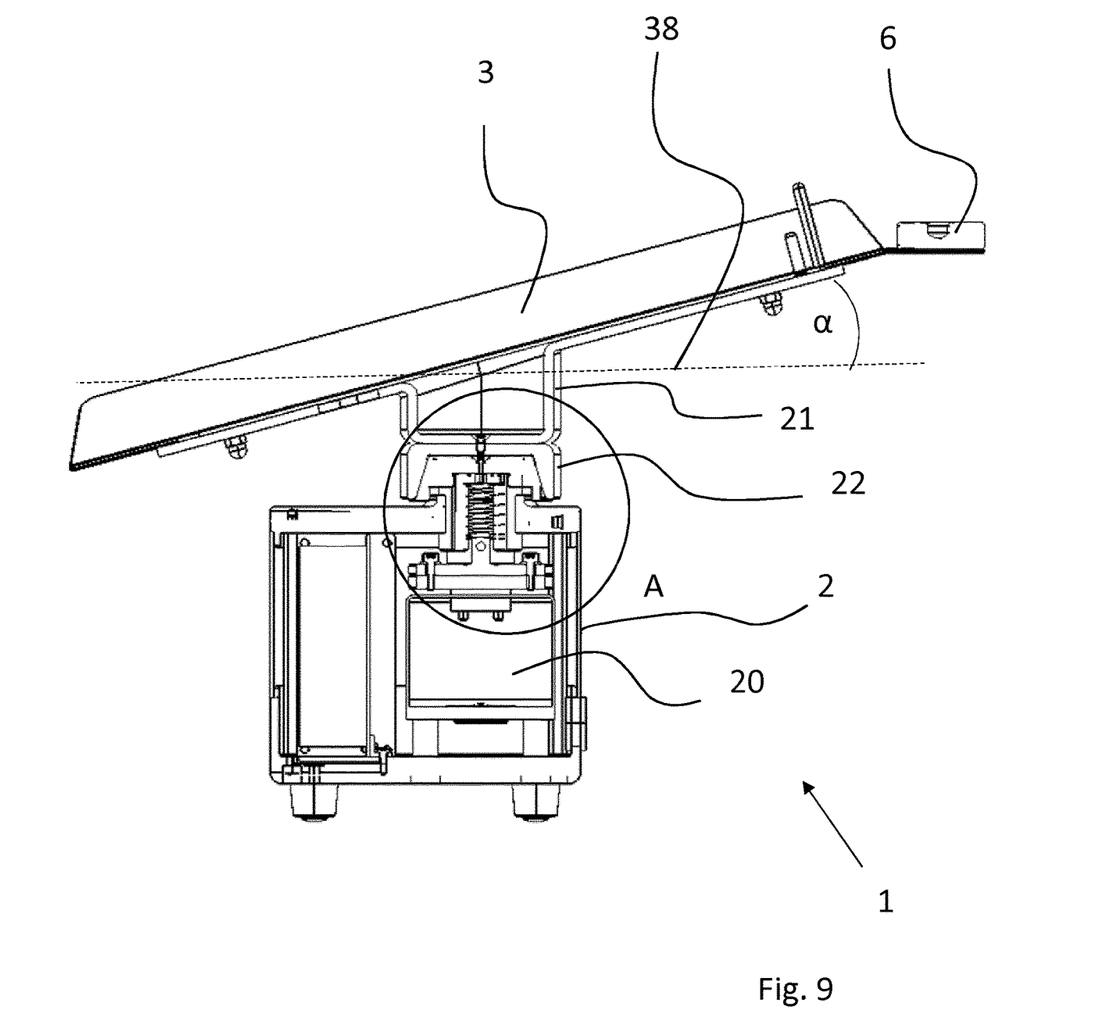
FIG. 9 is a cross-sectional view of the scales.

FIG. 9 shows a cross-sectional view of the scales 1. It is evident here that the weighing dish 3 has a mounting 21. This can have a cylindrical shape. At the same time the mounting 21 forms the receptacle 15 for the calibration weight 27.

With the mounting 21 the weighing dish 3 is connected via a carrier 22 to a load cell 20 integrated into the housing 2. The weighing dish 3 can be removed by simply lifting it upwards.

It is also evident that the weighing dish 3 in its main extension direction is tilted obliquely upwards with respect to the horizontal, which is symbolized by the dashed line 38, by the angle α in the direction of the tube holder 6. In this exemplary embodiment, the angle α is approximately 15°.

The weighing dish 3 is fixedly connected to the mounting 21, in particular it can also be implemented integrally with the mounting 21. In that case the angle α is therefore not adjustable.

Figure 10:
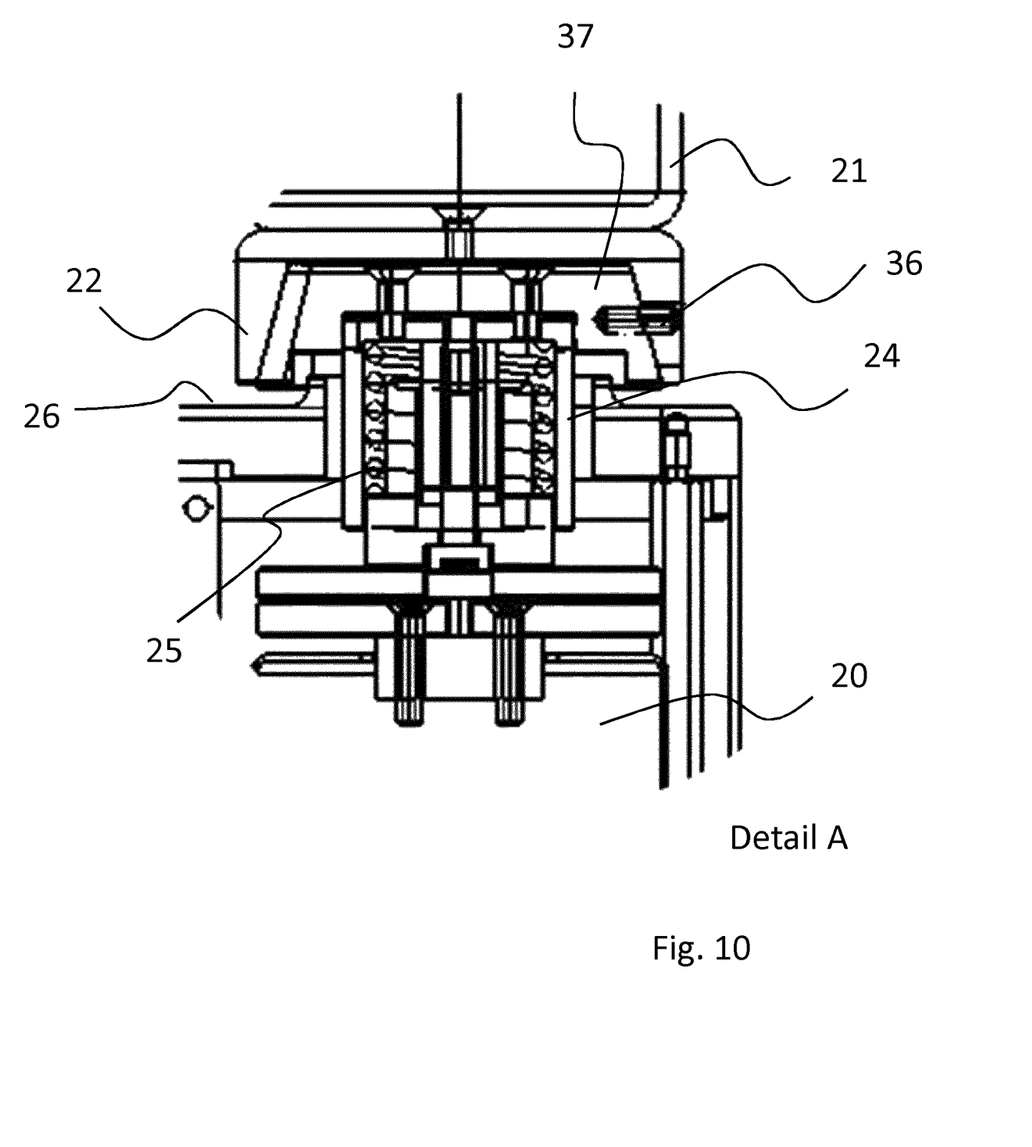
FIG. 10 is a detailed view of FIG. 9.

FIG. 10 is a detailed representation of the region A of FIG. 9.

Also evident in this representation is the way in which the mounting 21 of the weighing dish 3 is connected to the carrier 22.

The carrier 22 in turn sits on a spring housing 24, in which a helical spring 35 is inserted under pre-tension.

This spring housing 24 is in turn connected to the load cell 20.

The weight force of an object placed on the scales 1 is transferred via the spring 25 to the load cell 20.

In the permissible operating range of the scales 1, in other words if this is not overloaded, the spring 25 is not compressed. The weight force is therefore transmitted onto the load cell 20 via the spring housing 24, which is rigid as a result of the pre-tensioning of the spring 25.

If the weight force then exceeds a permissible value, which is defined by the pre-tensioning and the spring constant of the spring 25, the carrier 22 can compress and comes to rest on the top of the housing 26. The carrier 22 is therefore compressed to solid and it is no longer possible to apply a higher force to the load cell 20. Thus, an overload protection for the load cell 20 is implemented in a simple way.

In order to be able to remove the weighing dish, the carrier 22 comprises an inner part 37, which by means of at least one pin 36 is only secured against rotation. The weighing dish can therefore be removed together with the mounting 21 and the part of the carrier 22 extending around the inner part 37.

Figure 11:
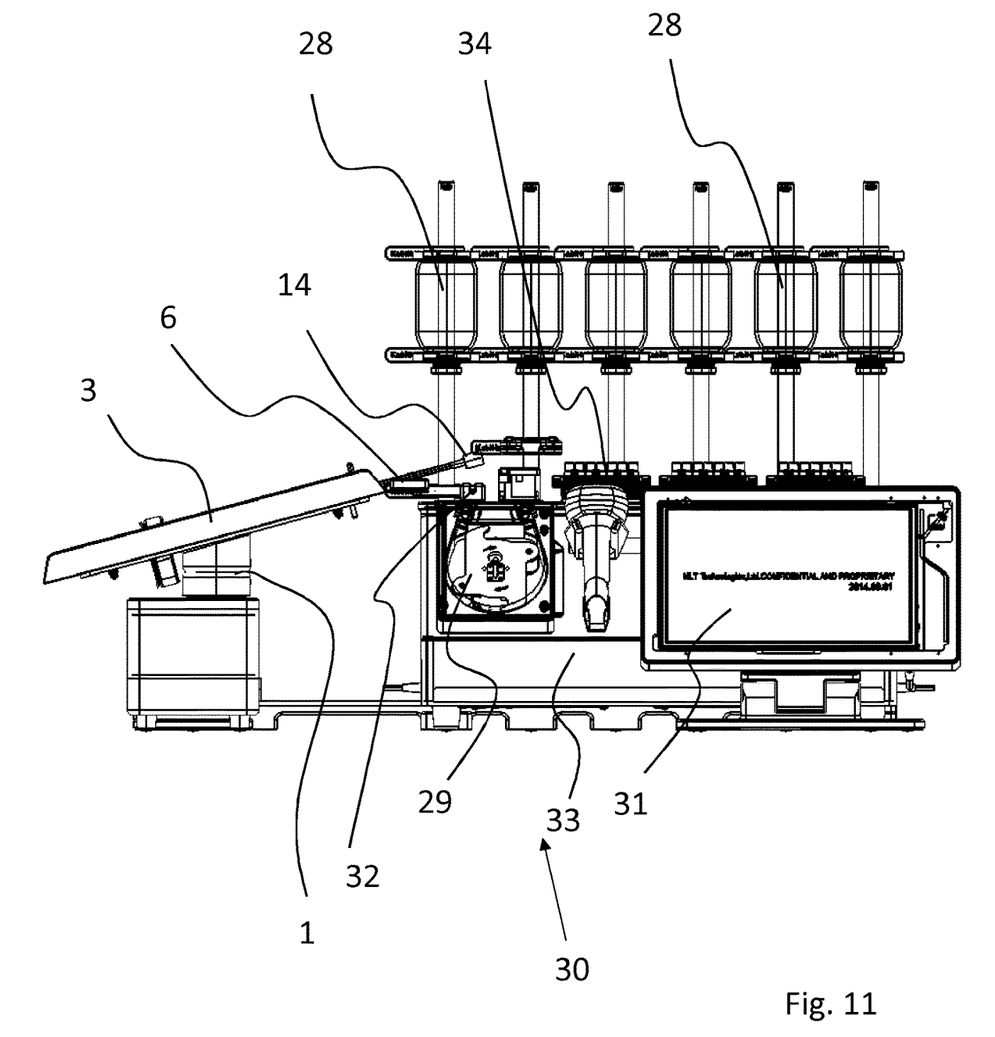
FIG. 11 shows an installation for producing medical preparations, in which the scales shown in the drawings FIG. 1 to FIG. 10 is integrated.

FIG. 11 shows an installation 30 for producing a medical preparation.

The installation 30 comprises a plurality of source containers 28 and a pump 29.

The installation 30 further comprises at least one valve unit 34, by means of which the supply from the individual source containers 28 can be controlled.

The source containers 28 are connected to the valve unit via tubes, not shown.

An outlet of the valve unit 34 is connected using an additional tube (not shown) to the connector 14 of the target container, here implemented as an infusion pouch.

The installation 30 is computer-controlled and in this case has a touch-controlled display 31 for operating it.

To produce a medical preparation, by means of the pump 29 the desired constituents are then extracted from the source containers 28 and transferred into the target container. The entire dosing process is computer-controlled.

The target container, of which only the connector 14 is visible, is arranged on the balance 1. By means of the scales 1, which are connected via an electronic interface (not shown) to a control unit of the installation 30, the quantity of the fluids supplied to the target container can be controlled.

The installation 30 has a modular design, which means that the balance 1 is designed as a separate unit that can be removed separately from an installation module 33, which comprises in particular the pump 29 and the valve unit 34.

Also evident is the fact that the tube holder 6 is positioned at approximately the same height as a tube holder 32 arranged on the installation module 31.

Due to the horizontally arranged tube holder 6, which is at the same height as the tube holder 32, the risk of the unwanted application of relatively significant forces via the connector 14 is reduced.

The weighing dish 3 spans at least a part of the space between the installation module 33 and the housing 2 of the scales 1. This means the connector 14 of the target container moves close to the installation module, which keeps the length of the tube to the connector of the target container to a minimum.

The invention can facilitate depositing of diverse types of target container, in particular in the case of a TPN compounder.

LIST OF REFERENCE NUMERALS 1 balance
2 housing
3 weighing dish
4 side wings
5 removable device or plate
6 tube holder 7 second mounting means or pin
8 holder
9 mounting means or syringe holder
10 first mounting means or pin
11 edge
13 infusion pouch
14 connector
15 receptacle
16 recess
17 opening
18 hole
19 bracket
20 weighing dish
21 mounting
22 carrier
23 syringe
24 spring housing
25 spring
26 housing top
27 calibration weight
28 source container
29 pump
30 installation
31 display
32 tube holder
33 installation module
34 valve unit
35 carrier
36 pin
37 inner part
38 line

The invention claimed is:

1. A balance for weighing a target container designed for an installation for producing a medical preparation,
   comprising a weighing tray for depositing a target container,
   wherein the weighing tray comprises a removable device which can be arranged on the weighing tray in at least two weighing orientations, in such a way that a previously downward-facing side of the removable device faces upwards after a rotation of the removable device, while the removable device has at least one mounting means for a target container on one side.

2. The balance as claimed in claim 1, wherein the mounting means is provided in the form of a syringe holder.

3. The balance as claimed in claim 2, wherein the removable device has a first mounting means for a first infusion pouch, on the side on which the syringe holder is arranged.

4. The balance as claimed in claim 3, wherein the first mounting means for the first infusion pouch is provided in the form of form-fitting elements.

5. The balance as claimed in claim 1, wherein the weighing tray has a second mounting means for a second infusion pouch.

6. The balance as claimed in claim 5, wherein the second mounting means for the second infusion pouch is provided in the form of form-fitting elements.

7. The balance as claimed in claim 6, wherein the form-fitting elements of the weighing tray are spaced a greater distance apart than form-fitting elements which the removable device has.

8. The balance as claimed in claim 1, further comprising a receptacle for a calibration weight covered by the removable device.

9. The balance as claimed in claim 1, wherein the weighing tray is inclined with respect to a horizontal at an angle (a) between 5° and 40°.

10. The balance as claimed in claim 1, wherein the weighing tray has two angled side wings angled upwards.

11. The balance as claimed in claim 1, further comprising an overload protection arranged between the weighing tray and a load cell wherein the overload protection comprises a pre-tensioned spring between a carrier for the weighing tray and the load cell.

12. The balance as claimed in claim 1, wherein the weighing tray and/or the removable device is provided in aluminum or as an aluminum alloy.

13. An installation for producing a medical preparation, comprising a plurality of source containers and a target container which can be positioned on a balance according to claim 1, wherein by means of the installation liquids from the source containers can be transferred into the target container,
   wherein the balance comprises a replaceable mounting means for the target container.

14. The installation as claimed in claim 13, wherein the balance is connected to an electronic control device for the installation, wherein the amount of liquid transferred into the target container can be monitored using the balance.

15. The installation as claimed in claim 14, wherein the balance comprises a tube holder which is essentially at the same height as a tube holder of an adjacent installation module.

16. The balance as claimed in claim 1, wherein the removable device comprises a plate.

17. The balance as claimed in claim 4, wherein the form-fitting elements comprise pins.

18. The balance as claimed in claim 6, wherein the form-fitting elements comprise pins.

19. The balance as claimed in claim 9, wherein the weighing tray is inclined at the angle α of between 10° and 20° with respect to the horizontal.

20. The Balance as claimed in claim 12, wherein the weighing tray and/or the removable device comprises a nickel coating.

21. A balance for weighing a target container designed for an installation for producing a medical preparation,
   comprising a weighing tray for depositing a target container,
   wherein the weighing tray comprises a removable device which can be arranged on the weighing tray in at least two orientations, in such a way that a previously downward-facing side of the removable device faces upwards after a rotation, while the removable device has at least one mounting means for a target container on one side, and wherein the weighing tray is inclined with respect to a horizontal at an angle (a) between 5° and 40°.

22. The balance as claimed in claim 21, wherein the mounting means is provided in the form of a syringe holder.

23. The balance as claimed in claim 22, wherein the removable device has a first mounting means for a first infusion pouch, on the side on which the syringe holder is arranged, the first mounting means for the first infusion pouch is provided in the form of form-fitting elements.

24. The balance as claimed in claim 21, wherein the weighing tray has a second mounting means for a second infusion pouch, wherein the second mounting means for the second infusion pouch is provided in the form of form-fitting elements.

25. The balance as claimed in claim 21, further comprising a receptacle for a calibration weight covered by the removable device.

26. The balance as claimed in claim 21, wherein the weighing tray includes two angled side wings angled upwards.

27. The balance as claimed in claim 21, further comprising an overload protection is arranged between the weighing tray and a load cell wherein the overload protection comprises a pre-tensioned spring between a carrier for the weighing tray and the load cell.

28. The balance as claimed in claim 21, wherein the removable device comprises a plate.

29. The balance as claimed in claim 21, wherein the weighing tray is inclined at the angle α of between 10° and 20° with respect to the horizontal.

30. An installation for producing a medical preparation, comprising a plurality of source containers and a target container which can be positioned on a balance according to claim 21, wherein by means of the installation liquids from the source containers can be transferred into the target container, wherein the balance comprises a replaceable mounting means for the target container.

31. A balance for weighing a target container designed for an installation for producing a medical preparation,
    comprising a weighing tray for depositing a target container,
    wherein the weighing tray comprises a removable device which can be arranged on the weighing tray in at least two orientations, in such a way that a previously downward-facing side of the removable device faces upwards after a rotation, while the removable device has at least one mounting means for a target container on one side, and wherein the weighing tray includes two angled side wings angled upwards.

32. The balance as claimed in claim 31, wherein the removable device has a first mounting means for a first infusion pouch, on the side on which a syringe holder is arranged, the first mounting means for the first infusion pouch is provided in the form of form-fitting elements, wherein the weighing tray has a second mounting means for a second infusion pouch, wherein the second mounting means for the second infusion pouch is provided in the form of form-fitting elements.

33. The balance as claimed in claim 31, further comprising a receptacle for a calibration weight covered by the removable device.

34. The balance as claimed in claim 31, wherein the weighing tray has two angled side wings angled upwards.

35. The balance as claimed in claim 31, further comprising an overload protection is arranged between the weighing tray and a load cell wherein the overload protection comprises a pre-tensioned spring between a carrier for the weighing tray and the load cell.

36. The balance as claimed in claim 31, wherein the removable device comprises a plate.

37. An installation for producing a medical preparation, comprising a plurality of source containers and a target container which can be positioned on a balance according to claim 31, wherein by means of the installation liquids from the source containers can be transferred into the target container, wherein the balance comprises a replaceable mounting means for the target container.

38. The balance as claims in claim 1, wherein in a first of the at least two weighing orientations, a substantially flat surface of the removable device is upwardly facing and configured to receive for weighing a large object fillable with the medical preparation, and wherein in another of the at least two weighing orientations, the one side of the removable device including the at least one mounting means is upwardly facing and configured to receive for weighing another object fillable with the medical preparation, the other object being smaller than the large object receivable on the substantially flat surface of the removable device.

* * * * *